Figure 1:
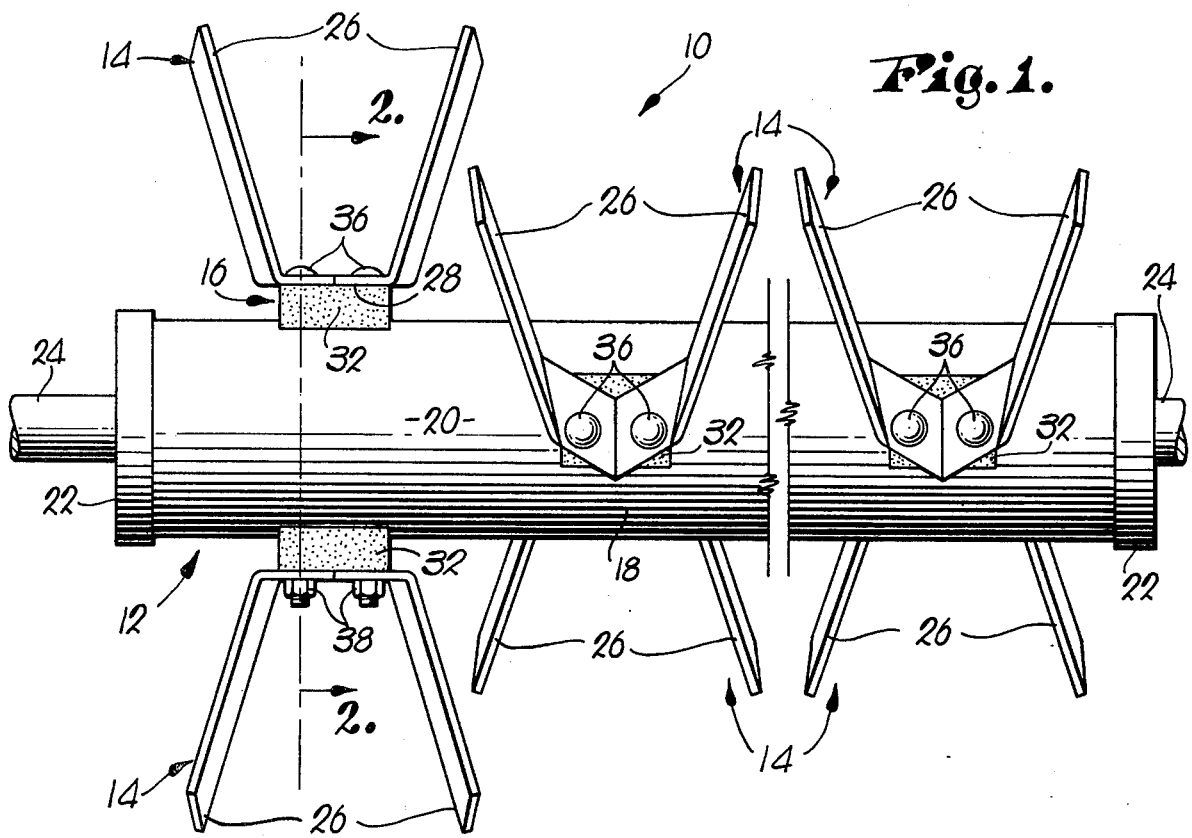

United States Patent [19]
Hill

[11] 4,021,995
[45] May 10, 1977

[54] CROP CONDITIONING ROTOR

[75] Inventor: Amos Grover Hill, Newton, Kans.

[73] Assignee: Hesston Corporation, Hesston, Kans.

[22] Filed: Nov. 10, 1975

[21] Appl. No.: 630,167

[52] U.S. Cl. .................................. 56/1; 56/400; 56/DIG. 1
[51] Int. Cl.² ........................................ A01D 57/00
[58] Field of Search ................. 56/1, DIG. 1, 12.7, 56/400, 364; 198/212

[56] References Cited
UNITED STATES PATENTS

| | | | |
|---|---|---|---|
| 2,508,454 | 5/1950 | Goodwin | 56/12.7 X |
| 3,206,920 | 9/1965 | Hofer | 56/364 |
| 3,859,777 | 1/1975 | Doering | 56/400 X |

FOREIGN PATENTS OR APPLICATIONS

| | | | |
|---|---|---|---|
| 1,058,467 | 11/1953 | France | 56/12.7 |
| 1,186,256 | 1/1965 | Germany | 56/400 |

*Primary Examiner*—J.N. Eskovitz
*Attorney, Agent, or Firm*—Schmidt, Johnson, Hovey & Williams

[57] ABSTRACT

Diametrically opposed, outwardly projecting elements of a rotor have rubber pads clamped between the same and the hub of the rotor by one or more fasteners common to both elements. The fasteners can shift axially through the hub in response to deflection of one of the elements counter to the direction of rotation of the rotor so that such deflection causes compression not only of the pad associated with the element encountering the deflecting force, but the pad of the opposite element as well.

11 Claims, 2 Drawing Figures

CROP CONDITIONING ROTOR

This invention relates to crop feeding or conditioning rotors carrying outwardly extending elements that engage severed crop material when the rotor is rotated whereby to feed the crop to a point of delivery and/or to "condition" the crop for proper curing. It specifically concerns rotors of this type wherein the outwardly extending elements are yieldably deflectable relative to the rest of the rotating structure for the purpose of accomodating violent shock loads experienced by the elements when rocks are encountered during rotation.

Rotors with spokes, tines, fingers or paddles that can deflect back counter to the direction of rotation when rocks are encountered are well-known in the art, and it is also known to have some type of resilient shock absorber captively disposed between the central hub of the rotor and the outwardly extending elements whereby deflection of an element causes a corresponding compression of the shock absorber, permitting the element to yield relative to the central structure when a shock load is experienced as well as causing the shock absorber to receive the energy imparted to the element.

A problem with rotors of this type is that the size of the shock absorbers has heretofore been large and they have projected from the hub for a relatively great distance in order to provide sufficient shock absorbing capability for the element. Within a given amount of space for the rotor, this diminishes the area which can be devoted purely to the element itself, hence detracting from the efficiency of the rotor as a crop feeder or conditioner. Moreover, prior devices of this type have been so constructed that only a portion of the shock absorber is used to absorb the energy imparted to the deflected element; that is, only the portion of the abosrber lying in the direction of the deflection is compressed when an element is deflected.

Accordingly, it is an important object of my invention to provide a rotor having deflectable elements connected to their respective shock absorbers in such a way that deflection of an element loads the shock absorber coupled with that element uniformly over the entire available area of the absorber.

A second important object of the present invention is to provide a rotor wherein its deflectable elements have shock absorbers between them and the hub and wherein the elements are arranged in diametrically opposed pairs with an operable connection between the elements of each pair such that deflection of one element causes compression not only of its own shock absorber, but that of the opposite element as well to thereby at least double the shock absorbing action available for each element without a corresponding increase in the size of its absorber.

Figure 2:
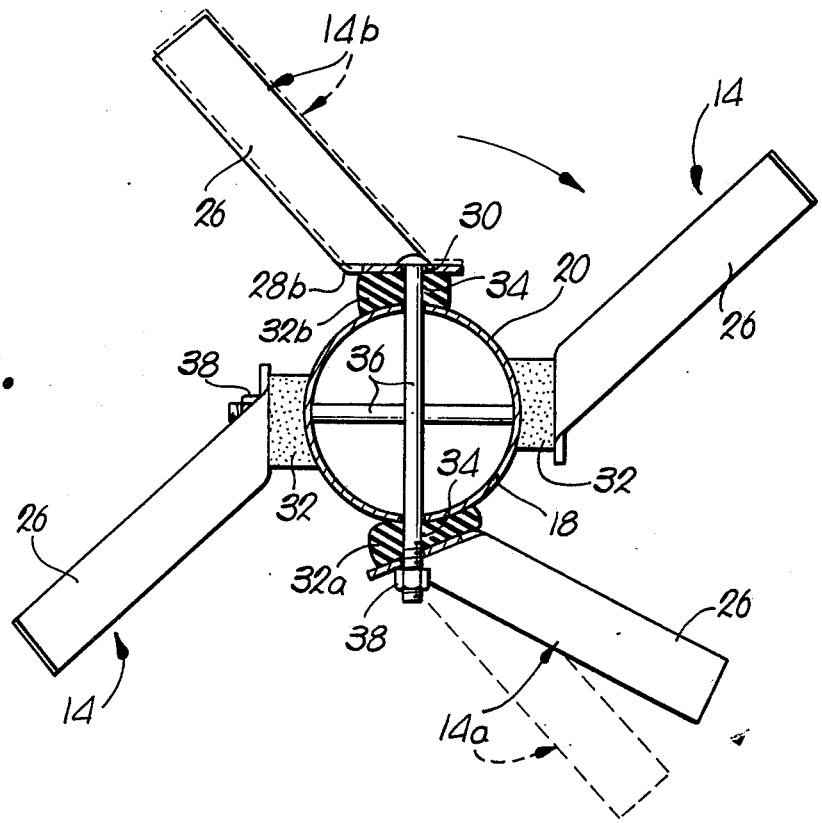

Another important object of the present invention is to provide a rotor of the type having a plurality of deflectable elements within the elements are mounted upon the rotor hub in such a manner that they may be forcibly moved outwardly from the hub to permit a greater degree of deflection relative to the hub. In the drawing:

FIG. 1 is a partial elevational view of a rotor constructed in accordance with the present invention; and FIG. 2 is a cross-sectional view of the rotor taken along line 2—2 of FIG. 1.

In FIG. 1 is shown a rotor 10 comprising a hub 12, a plurality of outwardly extending elements 14 and a number of shock absorbers 16 carried by said hub 12 and each associated with one of said elements 14. Hub 12 comprises an elongate, cylindrical tube 18 having an arcuate, outer surface 20 and enclosed on opposite ends by a pair of end caps 22. A rigid shaft 24 extends from each end cap 22 in axial alignment with tube 18 for journaled mounting on a supporting structure (not shown).

Each U-shaped element 14 comprises a pair of oblique crop conditioning blades 26 rigidly interconnected across the bight of the element to form a mounting surface 28 through which extends a pair of apertures 30. The relationship between the main portion of the blades 26 and surface 28 is such that when surface 28 faces surface 20, the blades 26 extend generally outwardly from hub 12.

Shock absorbers 16 each comprise a pad 32 of resilient material such as butyl rubber or the like. Each pad 32 is provided with a pair of apertures 34 (one only being shown) extending through the central portion of the pad 32.

In the preferred embodiment, the elements 14 are arranged on the hub 12 in diametrically opposed pairs. A pad 32 is positioned below each element 14 between surfaces 20 and 28, thereby rendering this element 14 rockable or deflectable relative to hub 12. The diametrically opposed elements 14 are operably interconnected by a pair of threaded fasteners 36 which extend radially through tube 18 and apertures 30, 34. Threaded fasteners 36 each include a nut 38 which may be adjusted to vary the bias of opposing elements 14 against their respective pads 32. While fasteners 36 clamp elements 14 against pads 32 and hub 12, they are free to move diametrically relative to tube 18, being restrained only by pads 32. Consequently, elements 14 are forcibly shiftable against the biasing of pads 32 toward and away from surface 20.

In operation, the rotor 10 is placed in an operating environment such as in the header of an agricultural implement and rotated clockwise viewing FIG. 2 to perform a desired function upon the crop such as feeding it to a point of delivery or conditioning it to improve the rate of curing. Under normal operating conditions, the crop conditioning blades 26 are held in their outwardly extending oblique dispositions relative to hub 12 by clamping action of fasteners 36 against the elements 14. Should an obstruction be encountered by one of the elements 14 during operation of the rotor (such as element 14a in FIG. 2), it may be rocked back out of its normal position such as shown in broken lines in FIG. 2 to a deflected position such as shown in solid lines in FIG. 2. The orientation of element 14a relative to hub 12 is thus changed to allow clearance of the obstruction and to dissipate the energy imparted to element 14a by collision with the obstruction.

As shown in FIG. 2, when element 14a is deflected, the opposite element 14b is also deflected by virtue of their operable interconnection through threaded fasteners 36, thereby effecting compression of the pad 32b associated with element 14b as well as compression of the pad 32a adjacent element 14a. It will be noted that the movement of element 14b accomplished by the element 14a is substantially translational in that surface 28b does not change its orientation relative to surface 20 and, consequently, substantially uniform compression of pad 32b is effected.

It is also of importance to understand that as the movement of element 14a causes translational movement of element 14b toward hub 12, the deflected element 14a is permitted to move radially outwardly from hub 12 by virtue of diametric movement of fasteners 36 relative to tube 18. The radial outward movement of element 14a allows that element to deflect even further, if necessary, in yielding to the original obstruction. Of course, once the obstruction is cleared, the elements 14a and 14b and fasteners 36 will return to their original equilibrium positions by operation of the biasing pads 32.

The advantages of the present invention over prior art devices are apparent when the operation of the device is understood. The mounting arrangement of the present invention permits more uniform loading of the shock absorber means (pad 32a becomes skewed when element 14a rocks, but pad 32b compresses symetrically) as well as allows a relatively great degree of element deflection without the necessity of positioning elements 14 excessively far from hub 12. In this connection, it will be recognized that forced deflection or rocking motion of element 14a effects substantially linear movement of its fasteners 36 to uniformly compress an opposed pad 32b while simultaneously permitting the element 14a a to shift radially outwardly in order to increase the extent to which element 14a may rock without striking hub 12. In other words, if fasteners 36 could not be pulled through tube 18 by element 14a when it was deflected, surface 28a could only tilt to the extent permitted by the fixed surface 20 and the fixed nuts 38. But, since the nuts 38 are displaced outwardly when their fasteners 36 are pulled through tube 18, the area available between nuts 38 and surface 20 increases to afford surface 28a a greater degree of tilt. Thus, element 14a can be deflected an extra amount to more easily clear the obstruction.

Accordingly, this increased area in which to deflect is obtained without permanently spacing the surfaces 28 a greater distance away from the surface 20, thereby permitting a greater percentage of the total diameter of rotor 10 to be devoted to crop conditioning surface. Moreover, the more uniform loading of pads 32 provides more efficient shock absorption and consequently, the size of shock absorbers needed to dissipate a given amount of energy can be reduced in comparison with prior art devices.

I claim:

1. A material handling rotor, including:
   a hub;
   an outwardly extending rigid element mounted on said hub for rocking movement relative to the latter;
   a shock-absorber on said hub spaced from said element; and
   structure operably interconnecting said shock absorber and said element for loading the shock absorber uniformly in response to said rocking of said element,
   said structure including an elongated member extending through said hub and axially shiftable within the latter,
   one end of said member being coupled directly with said rigid element and the opposite end of the member being coupled with said shock absorber whereby movement of said element relative to said hub is transmitted to said shock absorber.

2. A material handling rotor as claimed in claim 1, wherein said hub is provided with an outer surface and said element is shiftable outwardly from said surface, said shock-absorber yieldably biasing the element against said outward movement.

3. A material handling rotor as claimed in claim 2, wherein said shock absorber includes a pad of resilient material on said surface.

4. A material handling rotor as claimed in claim 3, wherein said pad is positioned on said hub diametrically opposed to said element.

5. A material handling rotor as claimed in claim 1, wherein said rotor further includes a second outwardly extending rigid element mounted on said hub for rocking movement relative to the latter, said shock absorber being between said second element and the hub.

6. A material handling rotor as claimed in claim 5, wherein said rotor additionally includes a second shock absorber on said hub, said second shock absorber being between said first-mentioned element and the hub and being operably interconnected with said second element by said member for loading the second shock absorber uniformly in response to rocking of said second element.

7. A material handling rotor as claimed in claim 6, wherein said shock absorbers comprise resilient pads.

8. A material handling rotor as claimed in claim 7, wherein said elements are diametrically opposed on said hub.

9. A material handling rotor as claimed in claim 8, wherein said elements are shiftable outwardly from said surface, said second shock absorber yieldably restraining said second element against said outward movement, and said first shock absorber yieldably restraining said first-mentioned element against said outward movement.

10. A material handling rotor as claimed in claim 9, wherein said member has shoulder means at its opposite ends limiting outward movement of the elements but permitting inward movement thereof against the action of said shock absorbers.

11. A material handling rotor as claimed in claim 10, wherein at least one of said shoulder means is adjustable toward and away from the hub for imparting a preselected degree of compression to said shock absorbers.

* * * * *